United States Patent
Zhang et al.

(10) Patent No.: US 12,015,156 B2
(45) Date of Patent: Jun. 18, 2024

(54) SOLVENTS AND SLURRIES COMPRISING A POLY(CARBOXYLIC ACID) BINDER FOR SILICON ELECTRODE MANUFACTURE

(71) Applicant: UCHICAGO ARGONNE, LLC, Chicago, IL (US)

(72) Inventors: Lu Zhang, Lisle, IL (US); Zhangxing Shi, Westmont, IL (US); Andrew Jansen, Bolingbrook, IL (US); Stephen Trask, Batavia, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 17/987,605

(22) Filed: Nov. 15, 2022

(65) Prior Publication Data

US 2023/0087760 A1 Mar. 23, 2023

Related U.S. Application Data

(62) Division of application No. 16/886,908, filed on May 29, 2020, now Pat. No. 11,532,818.

(51) Int. Cl.
*H01B 1/22* (2006.01)
*C08K 3/02* (2006.01)
(Continued)

(52) U.S. Cl.
CPC .............. *H01M 4/622* (2013.01); *C08K 3/02* (2013.01); *C08K 3/04* (2013.01); *C09D 1/00* (2013.01);
(Continued)

(58) Field of Classification Search
CPC ........... H01B 1/20; H01B 1/22; H01M 4/386; H01M 4/622; H01M 4/0404; H01M 4/0471; C09D 5/24; C09D 7/20; B05D 5/12
See application file for complete search history.

(56) References Cited

U.S. PATENT DOCUMENTS

2002/0009646 A1 1/2002 Matsubara et al.
2006/0134516 A1 6/2006 Im et al.
(Continued)

OTHER PUBLICATIONS

He et al."Polyvinyl alcohol grafted poly (acrylic acid) as water-soluble binder with enhanced adhesion capability and electrochemical performances for Si anode", Journal of Alloys and Compounds 763 (2018) 228-240.*

(Continued)

*Primary Examiner* — Mark Kopec
(74) *Attorney, Agent, or Firm* — Olson & Cepuritis, Ltd.

(57) ABSTRACT

An silicon-containing electrode is formed by coating a silicon-containing slurry onto a conductive current collector. The slurry comprises a binder solution comprising a poly (carboxylic acid) binder dissolved in a mixed solvent system comprising an amide solvent of Formula I, as described herein, and a second solvent which can be water and/or an organic solvent. The binder preferably comprises poly (acrylic acid). The mixed solvent system comprises about 10 to about 99 vol % of the amide solvent of Formula I. The binder solution is utilized as a solvent for a slurry of silicon-containing particles for preparing the silicon-containing electrode. The slurries comprising the mixed solvent system have higher viscosity and are more stable than slurries containing the same concentrations of silicon particles, carbon particles, and binder in water as the sole solvent.

18 Claims, 6 Drawing Sheets

(51) Int. Cl.

| | |
|---|---|
| *C08K 3/04* | (2006.01) |
| *C09D 1/00* | (2006.01) |
| *C09D 7/20* | (2018.01) |
| *C09D 7/40* | (2018.01) |
| *H01M 4/04* | (2006.01) |
| *H01M 4/134* | (2010.01) |
| *H01M 4/1395* | (2010.01) |
| *H01M 4/38* | (2006.01) |
| *H01M 4/60* | (2006.01) |
| *H01M 4/62* | (2006.01) |
| *H01M 10/0525* | (2010.01) |
| *H01M 4/02* | (2006.01) |

(52) U.S. Cl.
CPC .............. *C09D 7/20* (2018.01); *C09D 7/67* (2018.01); *H01B 1/22* (2013.01); *H01M 4/0404* (2013.01); *H01M 4/0471* (2013.01); *H01M 4/134* (2013.01); *H01M 4/1395* (2013.01); *H01M 4/386* (2013.01); *H01M 10/0525* (2013.01); *C08K 2003/023* (2013.01); *C08K 2201/005* (2013.01); *C08K 2201/011* (2013.01); *H01M 2004/027* (2013.01); *H01M 2220/20* (2013.01)

(56) References Cited

U.S. PATENT DOCUMENTS

| | | |
|---|---|---|
| 2012/0177992 A1 | 7/2012 | Miyoshi et al. |
| 2017/0077501 A1 | 3/2017 | Nishiura et al. |
| 2019/0036116 A1 | 1/2019 | Lu et al. |
| 2020/0243853 A1 | 7/2020 | Lee et al. |
| 2020/0321655 A1 | 10/2020 | Vaughey et al. |
| 2021/0399289 A1* | 12/2021 | Eshraghi ............... H01M 4/133 |
| 2022/0149376 A1* | 5/2022 | Kim ...................... H01M 4/625 |

OTHER PUBLICATIONS

Poly(4-vinylbenzoic acid): A Re-Engineered Binder for Improved Performance from Water-Free Slurry Processing for Silicon Graphite Composite Electrodes, ACS Appl. Energy Mater. 2019, 2, 6348-6354.*

Arora, P. et al., Battery Separators, Chemical Review 104, 4419-4462 (2004).

Gonzalez, J. et al., Thermodynamics of Binary Mixtures Containing N-alkylamides, Journal of Molecular Liquids 115, 93-103 (2004).

Jow et al., (Eds.) Electrolytes For Lithium and Lithium-Ion Batteries; Chapter 3, pp. 167-182; Springer, New York, NY (2014).

Ma, D. et al., Si-Based Anode Materials For Li-Ion Batteries: A Mini Review, Nano-Micro Letters 6 (4), 347-358 (2014).

Zhu, B. et al., Towards High Energy Density Lithium Battery Anodes: Silicon and Lithium, Chemical Science 10, 7132-7148 (2019).

* cited by examiner

SOLVENTS AND SLURRIES COMPRISING A POLY(CARBOXYLIC ACID) BINDER FOR SILICON ELECTRODE MANUFACTURE

CROSS-REFERENCE TO RELATED APPLICATIONS

This application is a divisional of U.S. application Ser. No. 16/886,908, filed on May 29, 2020, which is incorporated herein by reference in its entirety.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

This invention relates to processing solvents and slurries for manufacturing silicon electrodes for lithium-ion electrochemical cells.

BACKGROUND

The rapid development of electric vehicles (EVs), plug-in hybrid electric vehicles (HEVs), and portable electronic devices has created a high demand for next-generation lithium-ion batteries with higher specific capacities and higher efficiencies. One way to increase the energy density of a full electrochemical cell is to improve the anode capacity. The commercial anode materials currently used, notably graphite, have excellent stability and properties, however, their relatively low capacity has become a limiting factor in next-generation cell development. Partially or fully replacing the traditional graphite anode by silicon (Si) has been an area of interest for several years, since silicon is abundant, low-cost, and has a theoretical capacity (about 3640 mAh/g) approximately 10 times higher than graphite (about 370 mAh/g).

Silicon-based anodes typically comprise a mixture of graphite and a silicon material, such as silicon nanoparticles, in a binder matrix coated on a metal current collector (e.g., copper). The current widely used binder for silicon anodes in lithium-ion batteries is poly(acrylic acid), also known as PAA. Anodes for lithium-ion batteries are manufactured by coating a slurry of particles comprising an anode active material (i.e., a material capable of intercalating and deintercalating lithium during charging and discharging, respectively, of a lithium ion battery) such as graphite, silicon, or combination thereof. Silicon anode slurries comprising silicon or carbon and silicon particles suspended in aqueous PAA do not afford high enough viscosity for fabrication of silicon anodes in large scale manufacturing processes at desired binder levels for such anodes (e.g., about 10% PAA). The resulting slurries are unstable and the solids separate too easily for large scale anode manufacturing, although anodes can be made on a small (e.g., laboratory) scale from such slurries. Higher concentrations (20% or greater) of the binder are required to achieve acceptably stable slurries for large scale commercial use. Pre-lithiation of PAA has been used by others to improve the viscosity of PAA solutions, which improves the stability of electrode slurry. However, electrodes made with pre-lithiated PAA binder suffer more severe capacity loss during cycling tests than similar anodes made with the acid form of PAA.

In view of the viscosity issues associated with PAA binder, there is an ongoing need for new processing solvents for silicon anode slurries comprising a poly(carboxylic acid) binder such as PAA. The compositions and methods described herein address this need.

SUMMARY

The rheology of a poly(carboxylic acid) binder solutions (e.g., a PAA binder solution), can be modified by several approaches, such as pre-lithiation, chemical modification of the poly(carboxylic acid), and the choice of processing solvents. As described herein, switching processing solvents causes minimal changes to the binder and preserves desirable properties of the PAA and other poly(carboxylic acid) molecules. The solubility, hydrodynamic volume, and entanglement of polymers are depending on the solvation behavior of polymers in different solvents, which consequently lead to different rheology properties of the polymer solution.

For instance, the viscosity of a poly(carboxylic acid) binder solution, such as a PAA solution, increases significantly when using some organic solvents, e.g., some amide solvents, in place of water. However, Si-based electrodes with poly(carboxylic acid) binders prepared in common organic solvents, per se, typically suffer more severe capacity loss in cycling tests than electrodes processed in water. Novel processing solvents for Si-based anodes are described herein, which comprise a mixture of a first solvent and a second solvent, wherein the first solvent is an amide of Formula I:

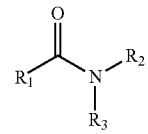

$R_1$, $R_2$, and $R_3$ each independently is H, alkyl, alkoxy, or a polyether group; and the second solvent is selected from the group consisting of water, an organic solvent, and a combination thereof. Non-limiting examples of suitable organic solvents include alcohols (e.g., methanol, ethanol and the like), ethers (e.g., tetrahydrofuran, 1,4-dioxane, and the like), nitriles (e.g., acetonitrile), and amides that are different from the first solvent (e.g., a different amide of Formula I).

In some embodiments, the second solvent is water, and the mixed solvent system comprises a volume ratio of the first solvent to the second solvent of about 99:1 to about, 1:9, i.e., about 10 to about 99 percent by volume (vol %). In some embodiments the first solvent is N-methylacetamide (MAA). In some other embodiments the second solvent is water. These new processing solvents exhibit enhanced dispersion of anode slurries, improved quality of laminates, and excellent cell performance when used to prepare anodes for Li-ion batteries.

Silicon-containing electrodes formed as described herein using a poly(carboxylic acid) binder, e.g., PAA, in the mixed solvent system, e.g., in the aqueous MAA solvent system, are mechanically robust anodes for lithium-ion batteries. In some preferred embodiments, the slurry comprises silicon-containing particles such as silicon nanoparticles, graphite particles, and carbon black particles. The slurries are coated onto an electrically conductive current collector (e.g., copper foil), and the coating is then dried to form an electrode, which can be used as an electrode in a lithium-ion battery or cell.

The following non-limiting embodiments are provided to illustrate certain aspects and features of the electrodes, electrochemical cells, batteries, and methods described herein.

Embodiment 1 is a silicon-containing slurry for manufacturing a silicon-containing electrode, the slurry comprising a poly(carboxylic acid) binder (e.g., poly(acrylic acid)) and a particulate anode active material in a mixed solvent system comprising a first solvent and a second solvent that is miscible with the first solvent; wherein first solvent is an amide of Formula I (e.g., MAA and the like):

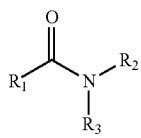

$R_1$, $R_2$, and $R_3$ each independently is H, alkyl, alkoxy, or a polyether group;
the second solvent is selected from the group consisting of water, and organic solvent, and a combination thereof;
the first solvent and the second solvent are present in the mixed solvent system in a respective volume ratio of about 99:1 to about 1:9;
the organic solvent comprises one or more material selected from the group consisting of an alcohol (e.g., a $C_1$ to $C_6$ alcohol such as methanol, ethanol, isopropanol, and the like), an ether (e.g., tetrahydrofuran, 1,4-dioxane, and the like), a nitrile (e.g., a $C_2$ to $C_6$ nitrile such as acetonitrile, propionitrile, and the like), and an amide that is different from the first solvent (e.g., dimethylformamide (DMF), dimethylacetamide, and the like); and
the particulate anode active material comprises silicon-containing particles (e.g., silicon nanoparticles), or a combination of silicon-containing particles and carbon particles (e.g., graphite, carbon black, or a combination of graphite and carbon black).

Embodiment 2 comprises the slurry of embodiment 1, wherein the slurry comprises about 50 to about 90 percent by weight (wt %) of the anode active material and about 10 to about 50 wt % of the poly(carboxylic acid) binder based on the combined weight of the anode active material and the binder present in the slurry.

Embodiment 3 comprises the slurry of embodiment 1 or 2, wherein the silicon-containing particles comprise at least one material selected from the group consisting of silicon nanoparticles, carbon coated silicon nanoparticles, and silicon/silicon oxide nano composite particles.

Embodiment 4 comprises the slurry of any one of embodiments 1 to 3, wherein the silicon-containing particles are silicon nanoparticles.

Embodiment 5 comprises the slurry of embodiment 4, wherein the silicon nanoparticles have a particle size in the range of about 10 to about 200 nm as determined by transmission electron microscopy (TEM).

Embodiment 6 comprises the slurry of any one of embodiments 1 to 5, wherein the slurry comprises about 10 to about 90 wt % of the silicon-containing particles.

Embodiment 7 comprises the slurry of any one of embodiments 1 to 6, wherein the slurry comprises about 5 to about 85 wt % of the carbon particles.

Embodiment 8 comprises the slurry of any one of embodiments 1 to 7, wherein the carbon particles comprise at least one material selected from the group consisting of graphite, carbon black, carbon nanotubes, carbon nanofibers, hard carbon, and graphene.

Embodiment 9 comprises the slurry of any one of embodiments 1 to 8, wherein the poly(carboxylic acid) comprises at least one material selected from the group consisting of poly(acrylic acid), alginic acid, carboxymethylcellulose, poly(aspartic acid), poly(glutamic acid), copolymers comprising poly(acrylic acid) chains, poly(methacrylic acid), and poly(4-vinylbenzoic acid).

Embodiment 10 comprises the slurry of any one of embodiments 1 to 9, wherein the anode active material comprises a mixture of the silicon-containing particles and the carbon particles in a respective weight ratio of about 1:9 to about 9:1.

Embodiment 11 comprises the slurry of any one of embodiments 1 to 10, wherein the mixed solvent comprises about 10 to about 90 vol % N-methylacetamide in water.

Embodiment 12 is a silicon-containing slurry for manufacturing a silicon-containing electrode, the slurry comprising a poly(acrylic acid) binder and a particulate anode active material in a mixed solvent comprising about 10 to about 90 vol % N-methylacetamide in water; wherein the particulate anode active material comprises silicon nanoparticles, or a combination of silicon nanoparticles and carbon particles; the slurry comprises 50 to about 90 wt % of the anode active material and about 10 to about 50 wt % of the binder based on the combined weight of the anode active material and binder present in the slurry, and the carbon particles comprise one or more materials selected from the group consisting of graphite, carbon black, carbon nanotubes, carbon nanofibers, hard carbon, and graphene.

Embodiment 13 comprises the slurry of embodiment 12, wherein the anode active material comprises a mixture of the silicon nanoparticles and the graphite particles in a respective weight ratio of about 1:9 to about 9:1.

Embodiment 14 comprises a method of manufacturing a silicon containing electrode, the method comprising coating the slurry of any one of embodiments 1 to 13 onto a conductive current collector, and drying the resulting coating.

Embodiment 15 comprises the method of embodiment 14 wherein the coating is performed on a reverse comma roll coating apparatus.

Embodiment 16 is an electrode formed by the method of embodiment 14 or 15.

Embodiment 17 is a lithium electrochemical cell comprising an anode, a cathode, a lithium ion-conducting separator between the anode and the cathode, and a lithium ion-containing electrolyte contacting the anode, the cathode, and the separator; wherein the anode is the electrode of embodiment 16.

Embodiment 18 is a battery comprising a plurality of electrochemical cells of embodiment 17 electrically connected together in series, in parallel, or in both series and parallel.

DETAILED DESCRIPTION

Figure 1:
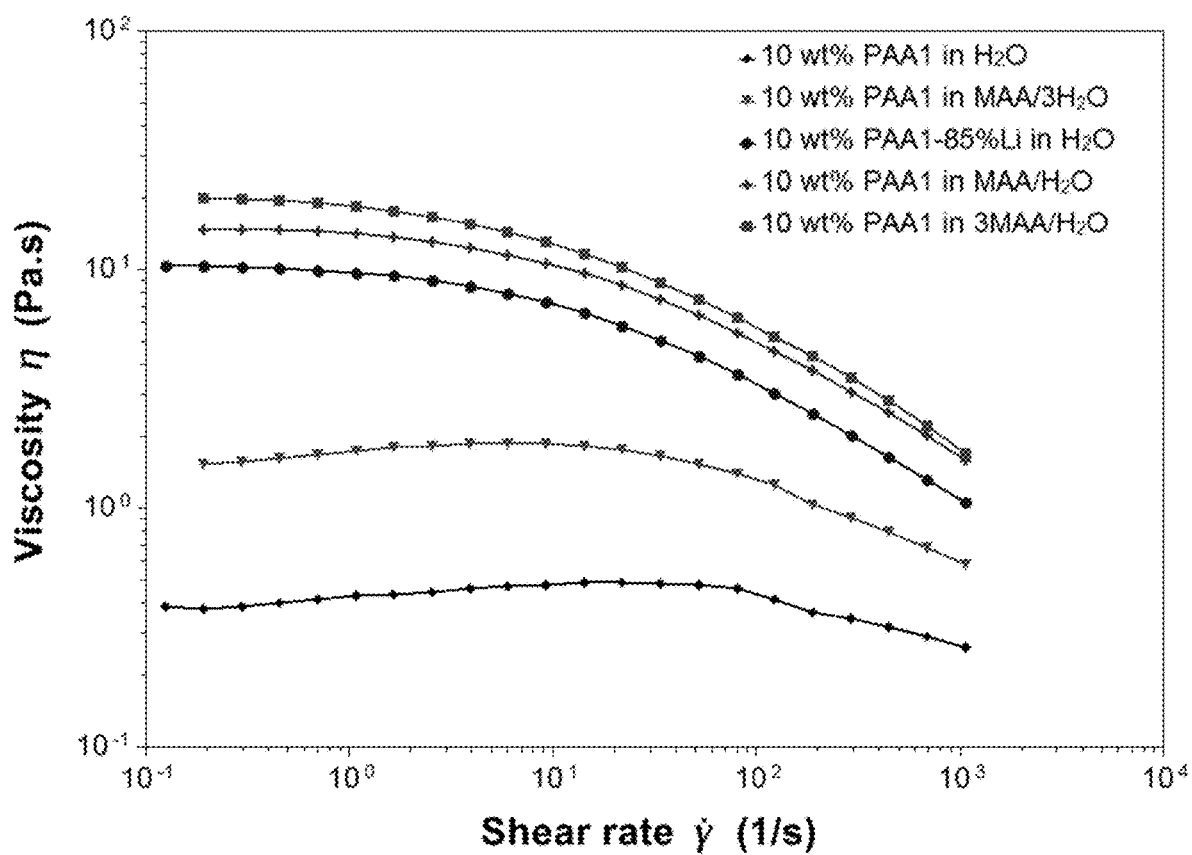
FIG. 1 shows the rheology profile of PAA solutions in MAA/water mixed processing solvents compared to PAA in water alone and a lithium salt of PAA (Li PAA) in water alone.

Binder solutions for manufacturing silicon-based anodes useful for lithium-ion electrochemical cells are described herein. The binder solution comprises a poly(carboxylic acid) binder dissolved in a mixture of two different solvents. The first solvent is an amide of Formula I was described herein, and the second solvent can be water, an organic solvent that is different from the first solvent, or a combination of water and the organic solvent.

In one embodiment, the binder solution comprises a poly(carboxylic acid) binder dissolved in a mixed solvent system comprising an amide of Formula I and a cosolvent comprising water, an organic solvent or a combination thereof. A preferred mixed solvent is aqueous N-methylacetamide (MAA). The binder preferably comprises poly(acrylic acid). The mixed solvent system preferably comprises about 10 to about 99 vol % of the compound of Formula I (e.g., about 10 to 90 wt %).

In Formula I:

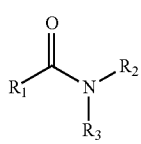

$R_1$, $R_2$, and $R_3$ each independently is H, alkyl, alkoxy, or a polyether group. Non-limiting examples of alkyl groups include $C_1$ to $C_6$ alkyl groups such as methyl, ethyl, propyl, isopropyl, butyl, sec-butyl, pentyl, and hexyl, cyclopentyl, cyclohexyl, and the like. Non-limiting examples of alkoxy groups include $C_1$ to $C_6$ alkoxy groups such as methoxy, ethoxy, propoxy, butoxy, and the like. Non-limiting examples of polyether groups include methoxyethoxy, ethoxyethoxy, ethoxymethoxy, poly(ethyleneoxy), poly(propyleneoxy), and the like.

The second solvent of the mixed solvent system can be water, and organic solvent, or a combination of water and an organic solvent. Non limiting Examples of organic solvents include, alcohols (e.g., a $C_1$ to $C_6$ alcohol such as methanol, ethanol, isopropanol, and the like), ethers (e.g., a cyclic ether such as tetrahydrofuran, and 1,4-dioxane; as well as a non-cyclic ether such as a di($C_2$-$C_6$ alkyl) ether), nitriles (e.g., a $C_2$ to $C_6$ nitrile such as acetonitrile, propionitrile, and the like), and amides, provided that the amide is different from the amide of the first solvent (e.g., dimethylformamide (DMF), dimethylacetamide, and the like).

Electrode slurries for manufacturing silicon-containing electrodes for Li-ion batteries also are described herein. The slurries comprise silicon particles, and optionally carbon particles suspended in the binder solution discussed above to form a slurry. The electrodes are formed by coating the slurry onto a current collector (e.g., copper foil, carbon fiber paper, and the like), and drying the coating to form the electrode. Such electrodes are useful as an anode for a Li-ion electrochemical cell or battery. The binder solutions provide higher viscosity, more stable slurries than using water alone as the solvent, which facilitates larger scale manufacture of the electrodes with lower binder concentrations than is feasible with slurries using only water as the solvent. Advantageously, the electrodes formed with poly(carboxylic acid) binders (e.g., PAA) in the mixed solvents described herein (e.g., aqueous MAA) have improved properties compared to electrodes formed with individual organic solvents as the sole slurry solvent.

In one embodiment, a silicon-containing slurry for manufacturing a silicon-containing electrode comprises a PAA binder and a particulate anode active material in a solvent comprising about 10 to about 90 vol % N-methylacetamide in water. The particulate anode active material comprises silicon-containing particles (e.g., silicon nanoparticles), or a combination of silicon-containing particles and carbon particles (e.g., graphite, carbon black, or a combination of graphite and carbon black).

The binder comprises a poly(carboxylic acid), which can be any poly(carboxylic acid), such as poly(acrylic acid) (PAA), poly(methacrylic acid), alginic acid, carboxymethylcellulose (CMC), poly(aspartic acid) (PAsp), poly(glutamic acid) (PGlu), copolymers comprising poly(acrylic acid) chains, poly(4-vinylbenzoic acid) (PV4BA), and the like, which is soluble in the aqueous MAA solvent. A preferred poly(carboxylic acid) is poly(acrylic acid). The poly(carboxylic acid) can have a $M_n$, as determined by GPC, in the range of about 1000 to about 450,000 Daltons (preferably about 50,000 to about 450,000 Daltons, e.g., about 130,000 Daltons).

The electrode includes silicon-containing particles, preferably combined with carbon particles. The silicon-containing particles can be silicon nanoparticles, silicon/silicon oxide (Si/SiOx) nanocomposite particles, silicon nanotubes, microporous silicon, an alloy or intermetallic compound of silicon with a metal such as magnesium, calcium, nickel, iron, or cobalt. Some examples of useful silicon-containing materials are discussed in Ma et al., *Nano-Micro Lett.*, 2014, 6(4):347-358, which is incorporated herein by reference in its entirety. Some other examples are mentioned in Zhu et al., *Chemical Science*, 2019 10, 7132, which is incorporated herein by reference in its entirety. Si/SiOx nanocomposite particles include e.g., materials described in co-owned, co-pending application Ser. No. 15/663,268 to Wenquan Lu et al., filed on Jul. 28, 2017 which is incorporated herein by reference in its entirety.

Preferably, the silicon-containing particles have an average size in the range of about 50 to about 200 nm, more preferably about 70 to about 150 nm. The carbon particles can be carbon microparticles or nanoparticles. Non-limiting examples of carbon materials include, e.g., carbon black, graphite, carbon nanotubes, carbon nanofibers, and graphene. Preferably, the electrode includes silicon and carbon particles in a respective weight ratio (Si:C) of about 1:9 to about 9:1, more preferably about 1:5 to about 8:1. The binder typically comprises about 5 to about 30 wt %, preferably about 10 to about 20 wt %, of the material coated on the current collector, based on the combined weight of the silicon, carbon and binder in the finished electrode (i.e., after drying). The loading of silicon and carbon particles and binder on the current collector typically is in the range of about 0.6 to about 3.2 mg/cm$^2$, preferably about 0.8 to about 2.7 mg/cm$^2$.

The electrolytes described herein comprise an electrolyte salt dissolved in any non-aqueous organic solvent that can be utilized in a lithium electrochemical cell. Non-limiting examples of such solvents include, e.g., one or more solvent selected from an ether, an ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme, diglyme or triglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate (e.g., FEC), a fluoro-substituted sulfolane, and a fluoro-substituted sulfone. The solvent can comprise a single solvent compound or a mixture of two or more solvent compounds. Preferred solvents include, e.g., oxyethylene ethers (e.g., glyme, diglyme, triglyme and tetraglyme), organic carbonates (e.g., any organic carbonate, preferably other than ethylene carbonate, such as EMC), or mixtures thereof.

The electrolyte salt can include any desired lithium salt that is compatible with a lithium electrochemical cell during electrochemical cycling (i.e., charging and discharging). Non-limiting examples of primary lithium salts useful in the electrolyte compositions described herein include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro(oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium hexafluoroarsenate (LiAsF$_6$), lithium nitrate, combinations of two or more thereof, and the like.

In some preferred embodiments, the lithium salt is LiPF$_6$. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between a Si anode and a cathode, and includes so-called full cells with a Si anode material, as well as so-called half-cells. In some embodiments, the lithium salt is present in the electrolyte at a concentration in the range of about 0.1 M to about 3 M, e.g., about 0.5 M to 2 M, or 1 M to 1.5M.

The electrolyte compositions described herein also can optionally comprise an additional additive such as those described in Jow et al. (Eds.), *Electrolytes for Lithium and Lithium-ion Batteries*; Chapter 3, pp. 167-182; Springer; New York, NY (2014), which is incorporated herein by reference in its entirety. Such additives can provide, e.g., benefits such as SEI, cathode protection, Li salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additional additive is present in the electrolyte at a concentration in the range of about 0.001 M to about 0.25 M, or about 0.01 M to about 0.1 M. A preferred additional additive is monofluoroethylene carbonate (FEC; also referred to herein as fluoroethylene carbonate), which preferably is utilized at a concentration in the range of 0.001 to about 5 M, e.g., about 0.1 to about 2.5 M.

Optionally, the electrolytes for an electrochemical cell described herein can include an added metal (M) salt, e.g., a Mg, Al, Ca, Sr, Sc, Y, Ga, salt or mixtures of such salts (at a concentration of about 0.001 to about 5 M), to promote in situ formation of amorphous Li-M-Si ternary phases in silicon anodes during the charging process, as described in co-pending, co-owned application Ser. No. 16/375,431 to John T. Vaughey et al., filed on Apr. 4, 2019, which is incorporated herein by reference in its entirety. The metal, M, is selected so to avoid anodic or cathodic activity other than insertion into Si to form ternary Zintl phases. These ternary phases, presumably forming initially on the surface of the anode particles, protect the underlying lithiated Si phases, reduce side reactions with the electrolyte, and limit the effect of large volume changes by reacting with freshly exposed surfaces. Examples of such salts include, e.g., Mg(TFSI)$_2$, Zn(TFSI)$_2$, Ca(TFSI)$_2$, Al(TFSI)$_3$, where TFSI stands for bis(trifluoromethanesulfonyl)imidate.

The silicon-based electrodes described herein can be incorporated in a lithium-ion electrochemical cell comprising a positive electrode (cathode), the silicon-based electrode as an anode, and an ion-conductive separator between the cathode and anode, with the electrolyte in contact with both the anode and cathode, as is well known in the battery art. A battery can be formed by electrically connecting two or more such electrochemical cells in series, parallel, or a combination of series and parallel. The silicon-based anode can be utilized with any cathode or electrolyte compositions useful in lithium-ion batteries. Electrochemical cell and battery designs and configurations, anode and cathode materials, as well as electrolyte salts, solvents and other battery or electrode components (e.g., separator membranes, current collectors), which can be used in the electrolytes, cells and batteries described herein, are well known in the lithium battery art, e.g., as described in "Lithium Batteries Science and Technology" Gholam-Abbas Nazri and Gianfranco Pistoia, Eds., Springer Science+Business Media, LLC; New York, NY (2009), which is incorporated herein by reference in its entirety.

The separator component of the lithium-ion cell can be any separator used in the lithium battery art. A typical material is a porous polyalkylene material such as microporous polypropylene, microporous polyethylene, a microporous propylene-ethylene copolymer, or a combination thereof, e.g., a separator with layers of different polyalkylenes; a poly(vinylidene-difluoride)-polyacrylonitrile graft copolymer microporous separator; and the like. Examples of suitable separators are described in Arora et al., Chem. Rev. 2004, 104, 4419-4462, which is incorporated herein by reference in its entirety.

Processes used for manufacturing lithium cells and batteries are well known in the art. The active electrode materials are coated on both sides of current collectors (typically copper for the anode and aluminum for the cathode). The cathodes can utilize binders such as polyvinylidene difluoride, carboxymethylcellulose, poly(acrylic acid), or lithium polyacrylate, and the like, to aid in adhering cathode active materials to the current collectors.

The cathode active material typically is a lithium metal oxide material. Cell assembly typically is carried out on automated equipment. The first stage in the assembly process is to sandwich a separator between the anode and the cathode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed the cell can be subjected to one or more controlled charge/discharge cycles to activate the electrode materials. This is known as formation cycling. The formation cycling process is well known in the battery art and involves initially charging with a low voltage (or low current) (e.g., substantially lower than the full-cell voltage) and gradually building up the voltage.

In some embodiments, the cathode can comprise a layered lithium metal oxide cathode material such as $LiMO_2$ wherein M=Mn, Ni, Co or a combination thereof (e.g., layered $LiCoO_2$, a layered lithium nickel-manganese-cobalt oxide, often referred to as "NMC", such as $Ni_{0.5}Mn_{0.3}CO_{0.2}O_2$ (also known as "NMC 532"), $Ni_{0.6}Mn_{0.2}CO_{0.2}O_2$ (also known as "NMC 622"), and similar materials). In other embodiments, the cathode can comprise a spinel lithium metal oxide such as $Li_2M'_2O_4$ wherein M'=Mn, Ni, Co or a combination thereof; a structurally integrated 'layered-layered' (LL) lithium metal oxide such as $xLi_2MnO_3\cdot(1-x)LiMn_yM_{1-y}O_2$ wherein 0<x<1, 0<y<1, M=Ni, Co, or Ni and Co; a structurally integrated 'layered-spinel' (LS) lithium metal oxide such as $xLi_2MnO_3\cdot(1-x)Li_2Mn_yM_{2-y}O_4$ wherein 0<x<1, 0<y<2, M=Ni, Co, or Ni and Co; a structurally integrated 'layered-layered-spinel' (LLS) lithium metal oxide such as $z[xLi_2MnO_3\cdot Li_2Mn_yM_{2-y}O_4]\cdot(1-z)Li_2M'_2O_4$ wherein 0<x<1, 0<y<1, 0<z<1, M=Ni, Co, or Ni and Co, and M'=Mn, Ni, Co or a combination thereof (e.g., $0.85[0.25Li_2MnO_3\cdot(0.75)LiMn_{0.375}Ni_{0.375}Co_{0.25}O_2]\cdot0.15Li_2M'_2O_4$ wherein M'=a combination of Mn, Ni, and Co); or any other cathode active material used in lithium-ion batteries.

As used herein, a structurally-integrated composite metal oxide is a material that includes domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite metal oxides are different from and generally have different properties than mere mixtures of two or more metal oxide components (for example, mere mixtures do not share a common oxygen lattice).

The following non-limiting Examples are provided to illustrate certain features and aspects of the compositions and methods described herein.

Ex. 1. Silicon Electrode Preparation

NANOAMOR Silicon nanoparticles (about 70-130 nm particle size) were purchased from Nanostructured & Amorphous Materials, Inc. MAGE graphite flakes (about 2-4 μm particle size) were obtained from Hitachi. Conductive carbon particles (C45, about 50-60 nm particle size) were purchased from Timcal. Silicon-containing electrodes ("Si electrodes") were prepared by coating Cu foil (as the current collector) with a thoroughly mixed slurry containing 73 wt % graphite, 15 wt % Si nanoparticles, 10 wt % binder, and 2 wt % C45 conductive carbon (for Si-graphite electrodes), or 70 wt % silicon, 20 wt % binder, and 10 wt % C45 conductive carbon (for all-Si electrodes), using a doctor blade. The loading of active materials of the fabricated electrodes was controlled at about 2.5-2.7 $mg/cm^2$ for Si-graphite electrodes and about 0.8-1.2 $mg/cm^2$ for all-Si electrodes. The fabricated electrodes were dried, calendared, punched into 1.5 $cm^2$ disks, and further dried in a vacuum oven at 130° C. for 8 hours (h) before assembling into 2032-type stainless steel coin cells.

Ex.2. Viscometry

Poly(acrylic acid) (PAA, Mw=130,000), N-methylacetamide (MAA), acetonitrile, 1,4-dioxane, ethanol, N-methyl-2-pyrrolidone (NMP), dimethylacetamide (DMA), N-ethylacetamide (EAA), and N-methylpropionamide (MPA) were purchased from Sigma-Aldrich. 10 wt % binder solutions were prepared by dissolving PAA in the appropriate amount of processing solvent. Two types of processing solvent were used to prepare binder solutions: pure processing solvent and mixed processing solvent. The pure processing solvents only contain a single solvent including water, 1,4-dioxane, NMP, and DMA. The mixed processing solvents consisted of MAA and one or more other solvents including water, acetonitrile, 1,4-dioxane, ethanol, NMP, DMA, EAA, and MPA.

Rheological characterization of binder solutions was conducted at 25° C. using a TA Instruments model Discovery HR-3 rheometer equipped with a cone-plate geometry that has a cone diameter of 20 mm and an angle of 2° (truncation 52 μm). To minimize water evaporation, a solvent trap cover was used during the tests. The apparent viscosity at different shear rates was measured in a flow ramp.

FIG. 1 provides plots of apparent viscosity versus shear rate for aqueous solutions comprising 10% PAA in aqueous MAA comprising 25, 50 and 75 wt % MAA, as well 10 wt % PAA in water, and 10 wt % aqueous PAA that was 85% neutralized with lithium hydroxide (85% Li-PAA). As is evident in FIG. 1, aqueous MAA solutions of binder materials show high viscosity at low shear rate and shear thinning at high shear rate. The high viscosity provides desired dispersion of the silicon and carbon particles and improves the stability of the slurry. The shear thinning effect helps form a well-dispersed slurry when using a centrifugal mixer.

Figure 2:
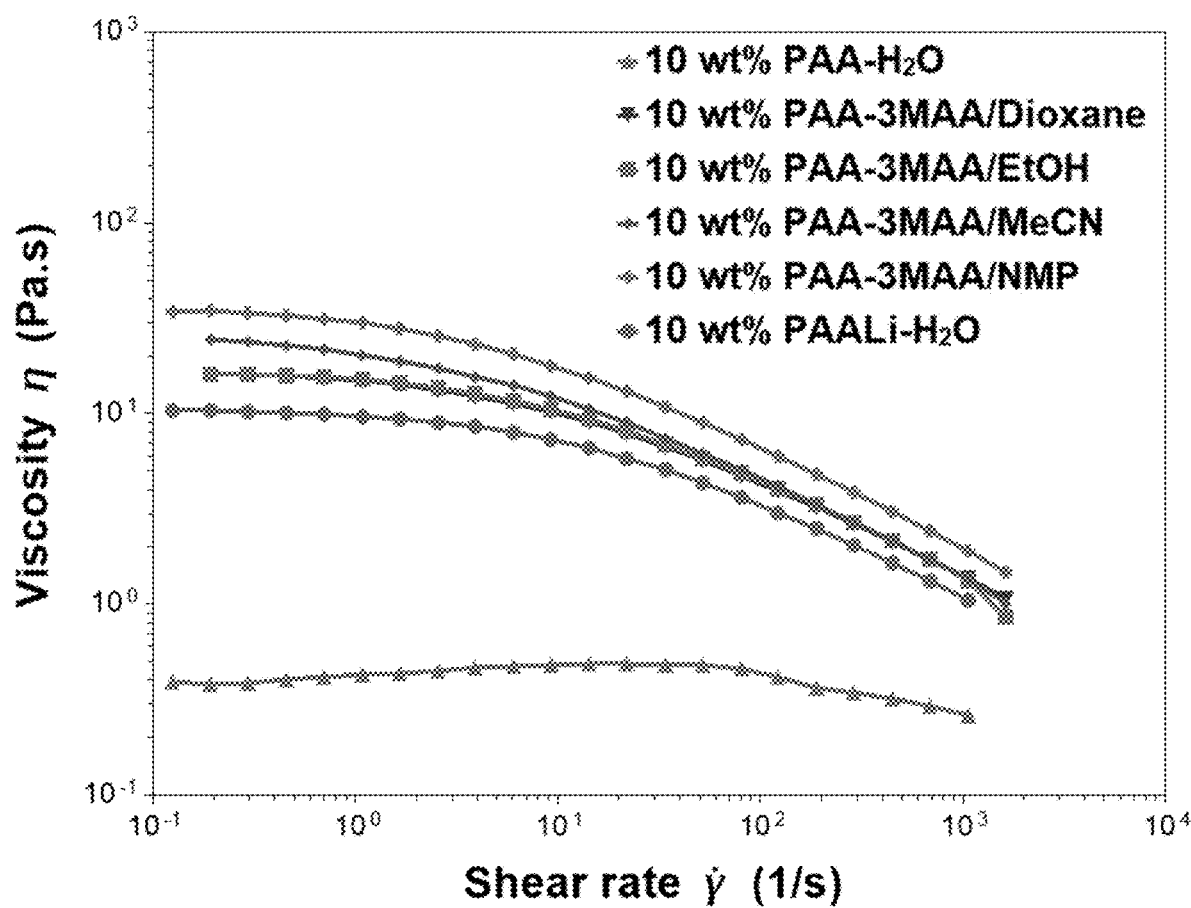
FIG. 2 provides plots of apparent viscosity versus shear rate for solutions comprising 10% PAA in 75 vol % MAA mixed with 25 vol % of dioxane, ethanol (EtOH), acetonitrile (MeCN), and NMP, compared to 10 wt % PAA in water, and 10 wt % aqueous PAA that was 85% neutralized with lithium hydroxide (Li-PAA).

FIG. 2 provides plots of apparent viscosity versus shear rate for solutions comprising 10% PAA in 75 vol % MAA mixed with 25 vol % of dioxane, ethanol (EtOH), acetonitrile (MeCN), and NMP, compared to 10 wt % PAA in water, and 10 wt % aqueous PAA that was 85% neutralized with lithium hydroxide (Li-PAA). As is evident in FIG. 2, the mixed MAA solutions of binder materials show high viscosity at low shear rate and shear thinning at high shear rate, as was the case for MAA in water.

Ex. 3. Electrode Evaluations and Results

Positive electrodes that contain 90 wt % $LiNi_{0.5}Mn_{0.3}Co_{0.2}O_2$ (NMC532), 5 wt % C45 conductive carbon, and 5 wt % PVDF binder were produced by the Cell Analysis, Modeling, and Prototyping (CAMP) facility of Argonne National Laboratory. Gen 2 electrolyte (1.2 M LiPF$_6$ in ethylene carbonate and ethyl methyl carbonate with weight ratio of 3:7) was purchased from Tomiyama Pure Chemical Industries. Fluoroethylene carbonate (FEC) was purchased from Solvay, dried, and distilled before use.

For half-cell evaluation, the cells were configured with a lithium metal counter electrode, a microporous polypropylene separator (CELGARD 2325), a Si-graphite composite electrode or all Si electrode, and Gen 2 electrolyte containing 10 wt % FEC (25 µL). The cells were subjected to three formation cycles at C/20 rate followed by 100 aging cycles at C/3 rate with the voltage window between 0.01 V and 1.50 V. The electrochemical performance of each processing solvent was determined by the average of two parallel cells.

For full cell evaluation, the Si anodes were paired with NMC532 cathodes with an areal capacity ratio of negative to positive electrodes (N/P ratio) between 1.1 to 1.2 relative to the anode. The cycling voltage was maintained between 3.0 V and 4.2 V with a cell testing protocol consisting of (i) three formation cycles at C/20 rate, (ii) a hybrid pulse power characterization (HPPC) sequence to measure area specific impedance (ASI) at different depths of discharge (DOD), (iii) 92 aging cycles at C/3 rate, (iv) another HPPC sequence, and (v) three final cycles at C/20 rate to measure capacity fade. In the HPPC test, the cells were charged at C/3 rate to 4.2 V, discharged at C/3 rate to 10% DOD, rested at the open circuit voltage for 1 h, and then subjected to hybrid pulse sequence. The hybrid pulse sequence includes a discharge pulse at 3 C rate for 10 seconds (s), a rest for 40 s, a charge pulse at 2.25 C rate for 10 s, and another rest for 60 s. The impedance was calculated by using the applied current and the voltage differences before and after pulses.

Figure 3:
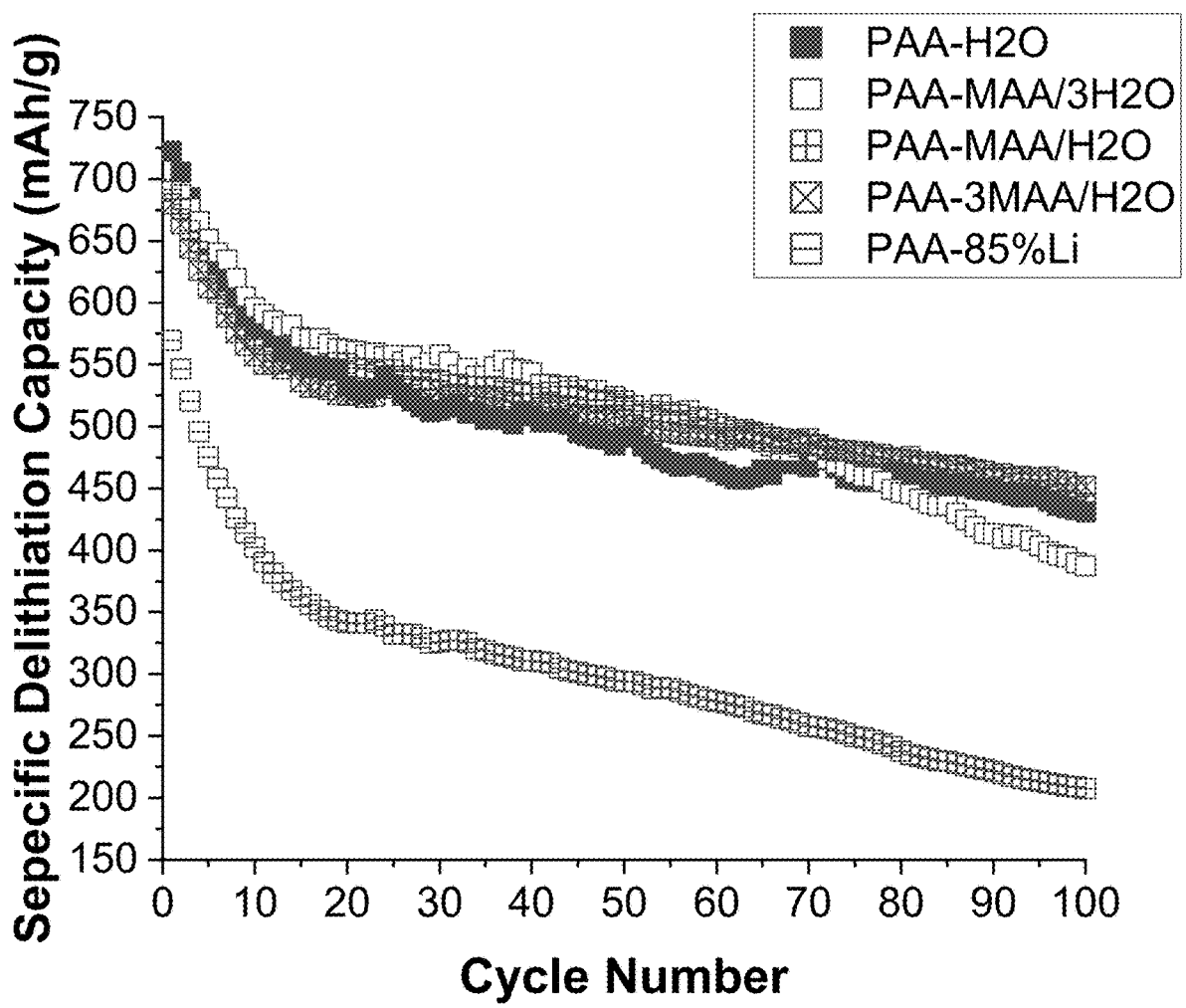
FIG. 3 shows the half-cell performance of Si-graphite composite electrodes during the course of 100 cycles at C/3 rate for electrodes prepared with MAA/water mixed processing solvents compared to PAA in water alone, and Li PAA in water alone.
Figure 4:
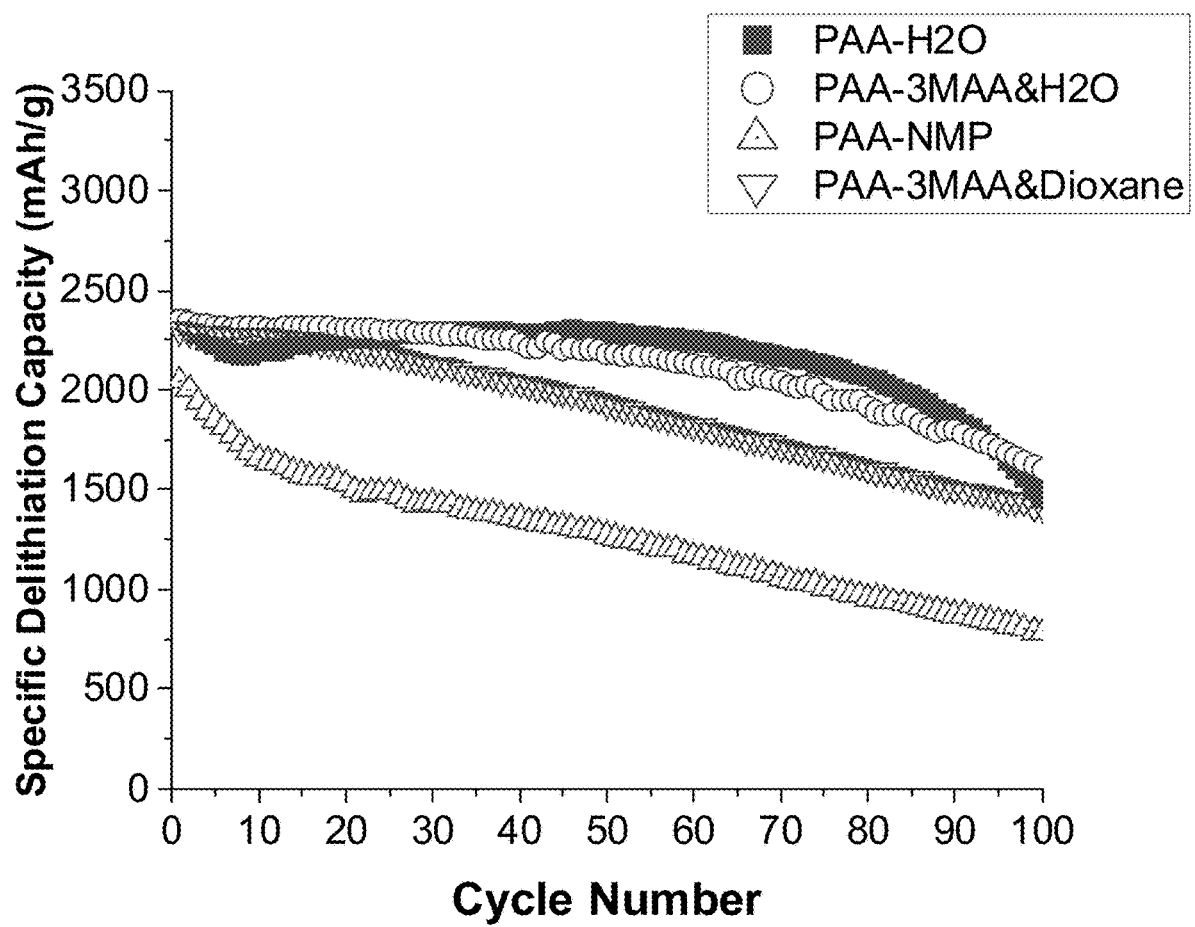
FIG. 4 provides plots of specific delithiation capacity versus cycle number showing the full-cell performance of Si-graphite composite electrodes during the course of 100 cycles at C/3 rate for electrodes prepared with 10% PAA binder in mixed processing solvents including 3:1 MAA:water, 1:1 MAA:NMP, and 3:1 MAA:dioxane, compared to PAA in water alone.

FIG. 3 provides plots of specific delithiation capacity versus cycle number showing the half-cell performance of Si-graphite composite electrodes during the course of 100 cycles at C/3 rate for electrodes prepared with MAA/water mixed processing solvents compared to PAA in water alone, and Li PAA in water alone. FIG. 4 provides plots of specific delithiation capacity versus cycle number showing the full-cell performance of Si-graphite composite electrodes during the course of 100 cycles at C/3 rate for electrodes prepared with 10% PAA binder in mixed processing solvents including 3:1 MAA:water, 1:1 MAA:NMP, and 3:1 MAA:dioxane, compared to PAA in water alone.

The half-cell results in FIG. 3 demonstrate that electrodes formed using the mixed MAA/water processing solvents perform similarly to an electrode prepared with water alone as the processing solvent, and much better than the electrode prepared in water with Li-PAA binder. The full-cell results in FIG. 4 demonstrate that electrodes formed using the 3:1 MAA:water and 3:1 MAA:dioxane processing solvents perform similarly to an electrode prepared with water alone as the processing solvent, while the 1:1 MAA:NMP solvent provided a lower specific capacity than the other mixed solvents. Unlike water, however, the mixed solvent system described herein provides a binder solution viscosity suitable for larger scale electrode manufacturing.

Ex. 4. Exemplary Electrochemical Cell and Battery

Figure 5:
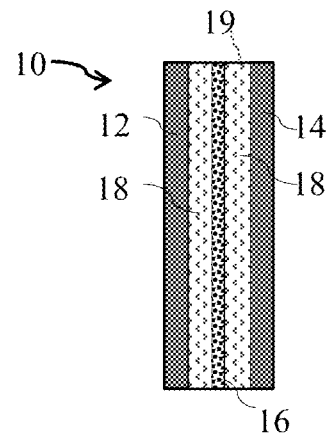
FIG. 5 schematically illustrates an electrochemical cell.
Figure 6:
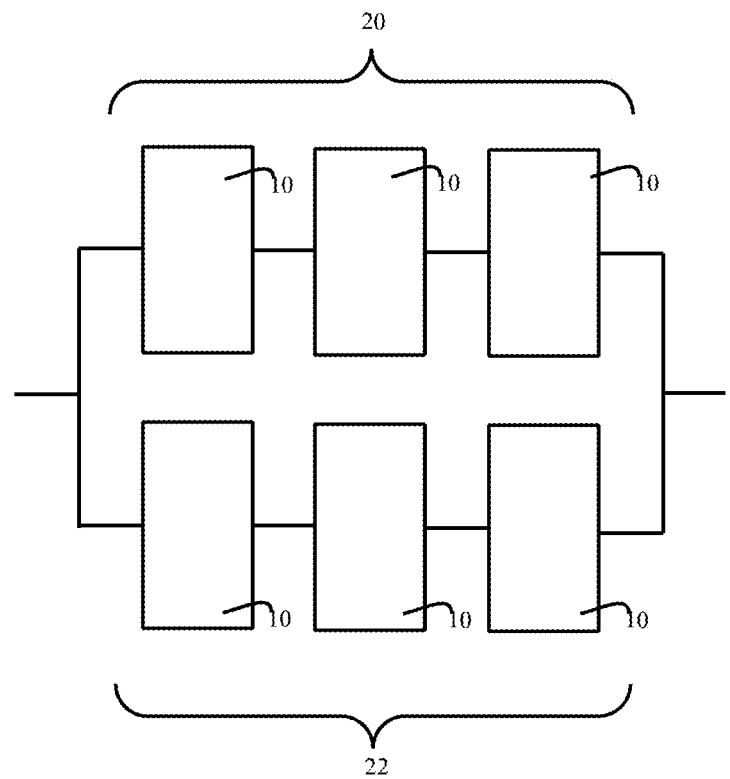
FIG. 6 schematically illustrates a battery comprising a plurality of an electrochemical cells electrically connected together.

FIG. 5 schematically illustrates a cross-sectional view of Li-ion electrochemical cell 10 comprising a first electrode 12 (e.g., comprising metallic or carbon current collector coated with a material capable of reversibly accepting and releasing lithium ions, such as an NMC compound; or comprising metallic lithium), and a silicon-containing second electrode 14 as described herein, with a porous separator 16 between electrodes 12 and 14. Electrolyte 18, comprising a lithium electrolyte salt (e.g., LiPF$_6$) in a non-aqueous solvent contacts electrodes 12 and 14 and separator 16. Optionally, one or both of electrodes 12 and 14 also can include a particulate carbon material. The electrodes, separator, and electrolyte are sealed within housing 19. FIG. 6 schematically illustrates a lithium battery comprising a first array 20 consisting of three series-connected electrochemical cells 10, and a second array 22 consisting of three series-connected electrochemical cells 10, in which first array 20 is electrically connected to second array 22 in parallel.

Ex. 5. Reverse Comma Roll to Roll Coating

The slurries described herein can be coated on sheets of the current collector material to prepare the coated electrodes. Advantageously, this coating process can be performed on reverse comma roll o roll coaters (also known as reverse comma roll coaters), which are well known in the art.

Figure 7:
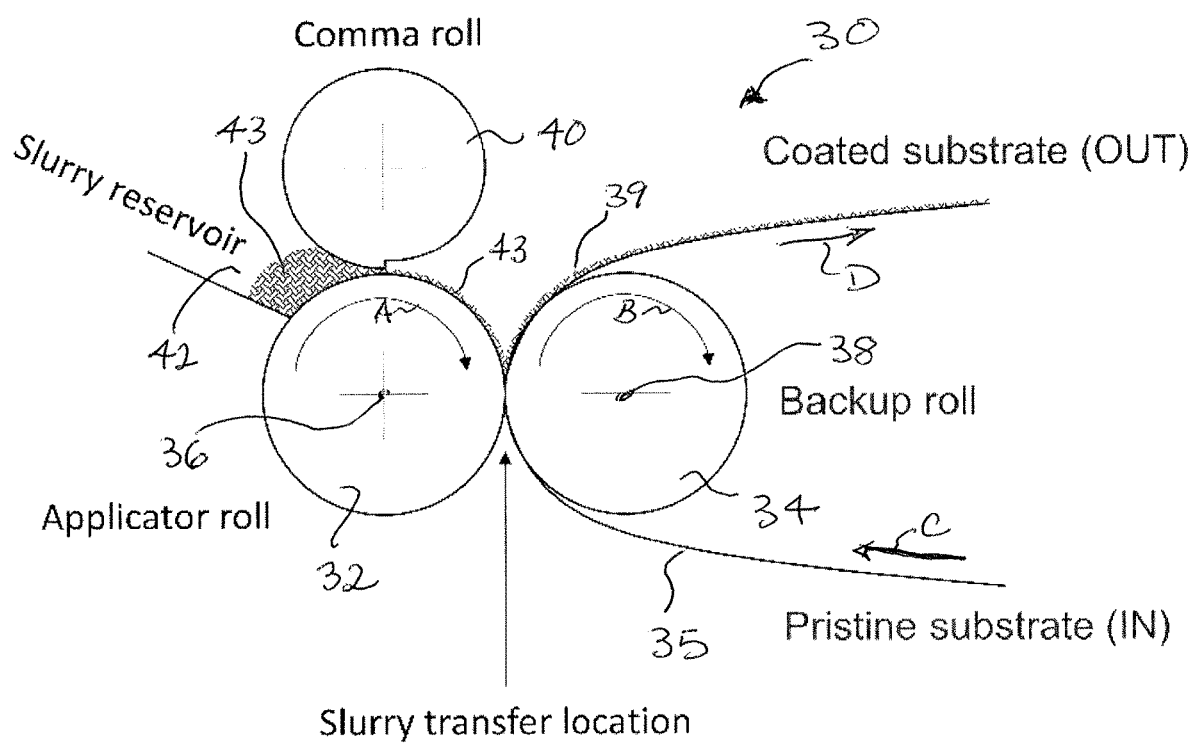
FIG. 7 schematically illustrates a roll to roll reverse comma coating apparatus and procedure.

FIG. 7 schematically illustrates a reverse comma roll to roll coating apparatus and procedure. Apparatus 30 comprises applicator roll 32 adjacent to and spaced from backup roll 34. A moving web of substrate 35 (e.g., metal foil) wraps around the portion of backup roll 34 between applicator roll 32 and backup roll 34. Both applicator roll 32 and backup roll 34 are adapted to rotate in the same direction (clockwise as illustrated by curved arrows A and B) around axes 36 and 38, respectively, while substrate 35 moves therebetween in the direction of arrows C and D. Stationary comma roll 40 is positioned adjacent applicator roll 32, and is adapted to meter and distribute slurry 43 from slurry reservoir 42 onto applicator roll 32. Rotation of applicator roll 32 distributes slurry 43 onto moving substrate 35 thereby laying down a coating 39 of slurry 43 on substrate 35.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A silicon-containing electrode formed by coating a silicon-containing slurry onto a conductive current collector, and drying the resulting coating; wherein the slurry comprises:
   a poly(carboxylic acid) binder and a particulate anode active material in a mixed solvent system comprising a first solvent and a second solvent that is miscible with the first solvent; wherein first solvent is an amide of Formula I:

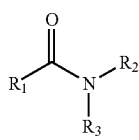

I $R_1$, $R_2$, and $R_3$ each independently is H, alkyl, alkoxy, or a polyether group;
the second solvent is selected from the group consisting of water, and organic solvent, and a combination thereof;
the first solvent and the second solvent are present in the mixed solvent system in a respective volume ratio of about 99:1 to about 1:9;
the organic solvent comprises one or more material selected from the group consisting of an alcohol, an ether, a nitrile, and an amide that is different from the amide of the first solvent; and
the particulate anode active material comprises silicon-containing particles, or a combination of silicon-containing particles and carbon particles;
wherein the poly(carboxylic acid) binder comprises at least one material selected from the group consisting of poly(aspartic acid), poly(glutamic acid), poly(methacrylic acid), and poly(4-vinylbenzoic acid).

2. The electrode of claim 1, wherein the slurry comprises about 50 to about 90 percent by weight (wt %) of the anode active material and about 10 to about 50 wt % of the poly(carboxylic acid) binder based on the combined weight of the anode active material and the binder present in the slurry.

3. The electrode of claim 1, wherein the silicon-containing particles comprise at least one material selected from the group consisting of silicon nanoparticles, carbon coated silicon nanoparticles, and silicon/silicon oxide nanocomposite particles.

4. The electrode of claim 1, wherein the silicon-containing particles comprise silicon nanoparticles.

5. The electrode of claim 4, wherein the silicon nanoparticles have a particle size in the range of about 10 to about 200 nm as determined by transmission electron microscopy.

6. The electrode of claim 1, wherein the slurry comprises about 10 to about 90 wt % of the silicon-containing particles.

7. The electrode of claim 1, wherein the slurry comprises about 5 to about 85 wt % of the carbon particles.

8. The electrode of claim 7, wherein the carbon particles comprise at least one material selected from the group consisting of graphite, carbon black, carbon nanotubes, carbon nanofibers, hard carbon, and graphene.

9. The electrode of claim 7, wherein the carbon particles comprise graphite.

10. The electrode of claim 1, wherein the anode active material comprises a mixture of the silicon-containing particles and the carbon particles in a respective weight ratio of about 1:9 to about 9:1.

11. The electrode of claim 1, wherein the mixed solvent comprises about 10 to about 90 vol % N-methylacetamide in water.

12. The electrode of claim 1, wherein the coating is performed on a reverse comma roll coating apparatus.

13. A lithium electrochemical cell comprising an anode, a cathode, a lithium ion-conducting separator between the anode and the cathode, and a lithium ion-containing electrolyte contacting the anode, the cathode, and the separator; wherein the anode is the electrode of claim 1.

14. A battery comprising a plurality of electrochemical cells of claim 13 electrically connected together in series, in parallel, or in both series and parallel.

15. A silicon-containing electrode formed by coating a silicon-containing slurry onto a conductive current collector, and drying the resulting coating; wherein the slurry comprises: a poly(carboxylic acid) binder and a particulate anode active material in a solvent comprising about 10 to about 90 vol % N-methylacetamide in water; wherein the particulate anode active material comprises silicon nanoparticles, or a combination of silicon nanoparticles and carbon particles; the slurry comprises 50 to about 90 wt % of the anode active material and about 10 to about 50 wt % of the binder based on the combined weight of the anode active material and binder present in the slurry, and the carbon particles comprise one or more materials selected from the group consisting of graphite, carbon black, carbon nanotubes, carbon nanofibers, hard carbon, and graphene; and wherein the coating is performed on a reverse comma roll coating apparatus;
   wherein the poly(carboxylic acid) binder comprises at least one material selected from the group consisting of poly(aspartic acid), poly(glutamic acid), poly(methacrylic acid), and poly(4-vinylbenzoic acid).

16. The electrode of claim 15, wherein the anode active material comprises a mixture of the silicon nanoparticles and the graphite particles in a respective weight ratio of about 1:9 to about 9:1.

17. A lithium electrochemical cell comprising an anode, a cathode, a lithium ion-conducting separator between the anode and the cathode, and a lithium ion-containing electrolyte contacting the anode, the cathode, and the separator; wherein the anode is the electrode of claim 15.

18. A battery comprising a plurality of electrochemical cells of claim 17 electrically connected together in series, in parallel, or in both series and parallel.

* * * * *